United States Patent
Gaertner

[11] 3,878,725
[45] Apr. 22, 1975

[54] CROSS-FLEXURE PIVOT FOR ELECTRONIC DIFFERENTIAL PRESSURE TRANSMITTER

[75] Inventor: Max Gaertner, Warminster, Pa.

[73] Assignee: Fischer and Porter Co., Warminster, Pa.

[22] Filed: Sept. 25, 1973

[21] Appl. No.: 400,687

[52] U.S. Cl............... 73/398 C; 73/407 R; 308/2 A
[51] Int. Cl. ............................................. G01l 9/12
[58] Field of Search .......... 73/398 C, 398 R, 407 R, 73/117.4; 308/2 A; 117/DIG. 9

[56] References Cited
UNITED STATES PATENTS
2,992,047  7/1961  Ecker................................. 308/2 A
3,564,923  2/1971  Nudd, Jr., et al. ................ 73/407 R

*Primary Examiner*—Donald O. Woodiel

[57] ABSTRACT

An electronic differential pressure transmitter for use with industrial processes to produce an output signal suitable for transmission to a remote station for operating, indicating, recording or control equipment. The transmitter includes a force bar to which an input force is applied, the resultant bar displacement being sensed by a detector coupled to an electronic circuit yielding a feedback signal proportional to the input force. The feedback signal is fed to a motor whose operating arm applies to the bar a rebalancing force in opposition to the input force. Linkage between the arm of the motor and the upper end of the force bar is effected by a connecting rod which causes the motor arm to rotate about a pivot formed by a cross flexure formed by a stationary platform piece and a wing piece pivoted therefrom by intersecting wires, axial displacement of the wing piece being prevented by a torsion rod disposed in parallel relation to the pivot axis passing through the points of intersection of the wires.

6 Claims, 4 Drawing Figures

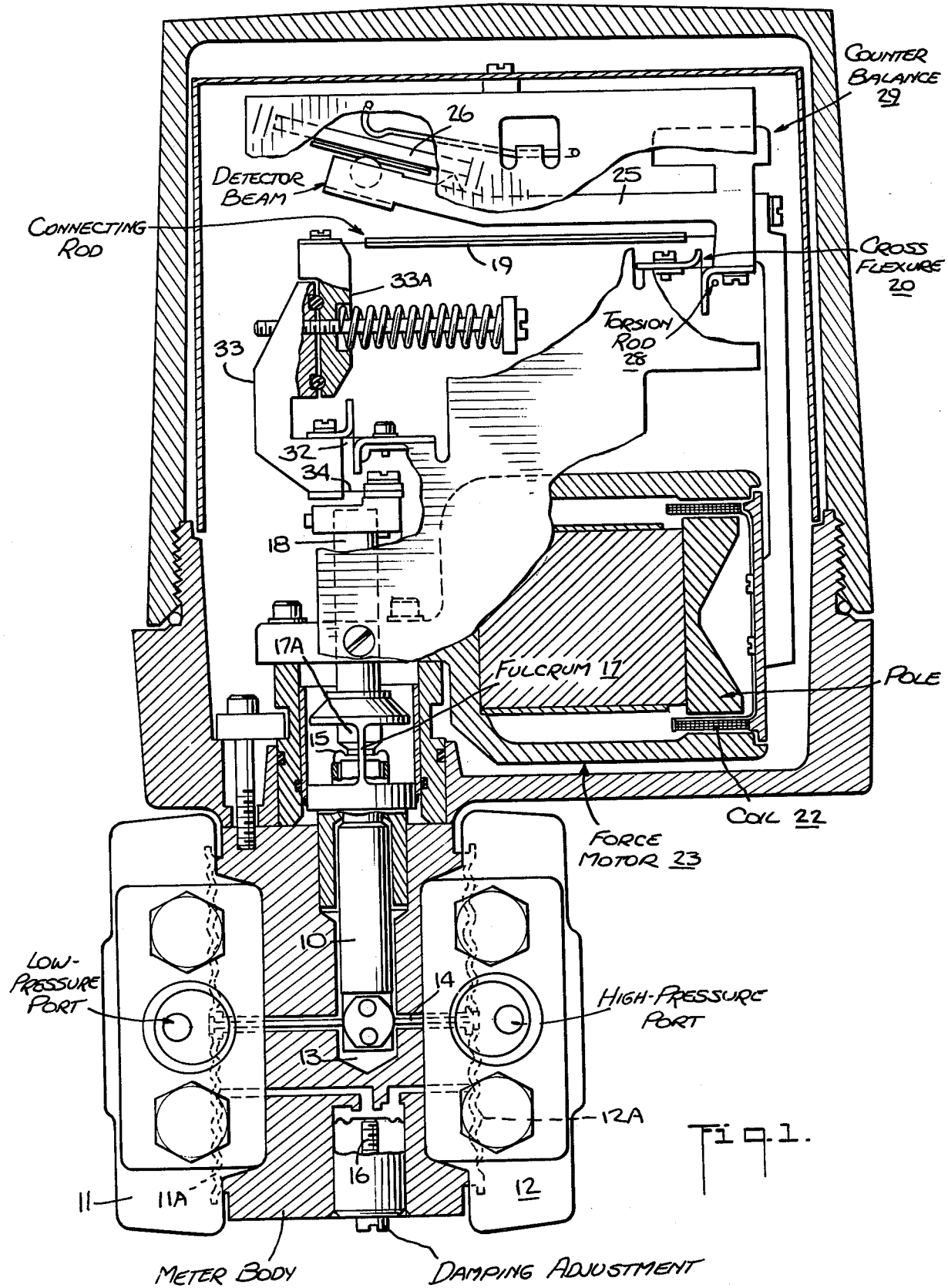

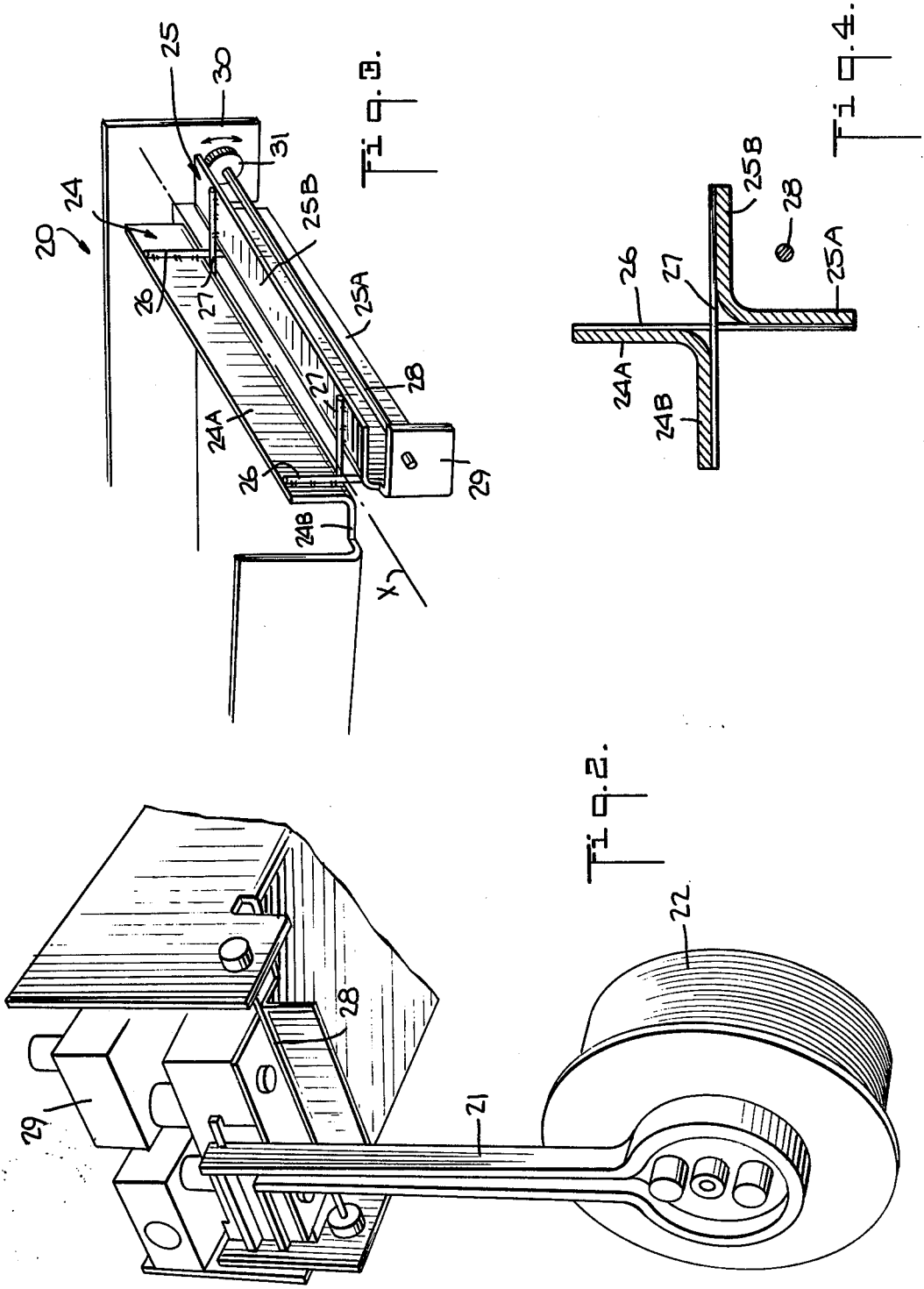

CROSS-FLEXURE PIVOT FOR ELECTRONIC DIFFERENTIAL PRESSURE TRANSMITTER

BACKGROUND OF THE INVENTION

This invention relates generally to electronic differential pressure transmitters operating on the force balance principle, and more particularly to an improved cross flexure pivot for such transmitters.

One important application of the force balance principle is in the differential-pressure flow transmitter. In a transmitter of this type, an elongated force bar is pivoted about a transverse axis. An input force derived from a differential-pressure capsule and corresponding to the pressure drop thru an orifice by the flow of the fluid to be measured, is applied to the force bar to produce a torque about its fulcrum. Also applied is a rebalance torque which tends to hold the bar motionless. Another application is for level transmitters where differential pressure is proportional to the tank level.

The rebalance torque is produced by a negative feedback loop that includes a detector to sense any slight change in force bar position. The detector develops a corresponding feedback signal which is fed to a feedback motor that applies to the force bar a force in opposition to the input force. This feedback signal is proportional to the differential pressure produced by the flow rate being measured and is used therefore to produce an output signal for transmission to a remote control station or to an indicating or recording device.

In a force-balance transmitter, there is virtually no movement of the force bar over the full-scale range of operation. This virtual absence of movement is highly advantageous, for it effectively eliminates hysteresis and other errors of the type encountered in so-called motion-balance instruments.

In a force-balance instrument of the electronic type, the feedback system is provided with an electric force motor, and the output signal is electrical in nature, as disclosed, for example, in the prior U.S. Pat. No. 3,574,923.

In the copending application Ser. No. 327,562 of Levesque and Gaertner, filed 1/29/73 entitled "Electronic Differential Pressure Transmitter" (common assignee) there is disclosed an instrument in which an input force is applied to a force bar to effect displacement thereof from a balanced position. A detector is mechanically coupled to the bar to produce an electrical value that varies as a function of this displacement. The detector is connected to an electronic circuit which produces an output signal proportional to the displacement of the bar, this signal being applied to an electrical force motor mechanically coupled to the force bar to apply a force thereto in opposition to the input force to rebalance the bar. The mechanical linkage between the force bar and the force motor is effected by a connecting rod which causes the motor arm to rotate about a pivot formed by a cross-flexure structure.

Heretofore, a cross-flexure frictionless pivot for this purpose included crossed flat ribbons to allow bending with relatively low force in a rotary mode, the ribbons resisting axial motion of the flexure. Such crossed ribbon flexure pivots have certain practical disadvantages by reason of warpage in the ribbons introduced in the course of manufacture or by stresses of the flexure assembly caused by thermal expansion of the mounting supports. As a consequence, the bands or ribbons tend to become bi-stable and produce so-called "oil-can" or "cricket" effects. This gives rise to an undesirable non-linearity in the restraining forces in the pivot.

SUMMARY OF THE INVENTION

In view of the foregoing, it is the main object of this invention to provide a cross-flexure pivot which makes use of intersecting wires that are free to bend in any plane, thereby avoiding cricket and oil-can effects characteristic of flexures formed by ribbons or bands.

More particularly it is an object of this invention to provide a cross-flexure pivot in which a wing piece is pivoted on a stationary platform piece by intersecting wires to produce a highly linear, frictionless pivot.

Also an object of the invention is to provide a cross-flexure pivot of the above-type wherein axial motion of the wing piece is prevented by a torsion rod disposed along an axis parallel to the pivot axis, one end of the rod being attached to the wing piece and the other to the platform piece whereby the rod retrains axial displacement of the wing piece without impeding a swinging motion thereof about said pivot axis. A significant advantage of the torsion rod arrangement is that a predetermined amount of torque may be applied thereto to set the mechanism for zero.

While the invention will be disclosed in conjunction with a differential-pressure transmitter it will be appreciated that the cross-flexure pivot is also applicable to many other types of instruments which require a frictionless pivot that can be zero set, such as level transmitters with large elevation or suppression zero bias.

Briefly stated, in a cross-flexure pivot in accordance with the invention, there is provided a stationary frame piece having an L-shaped formation defining a vertical and horizontal ledge having a linear junction and a movable wing piece having a reverse L-shaped formation defining a vertical and horizontal ledge whose linear junction lies in parallel relation to the platform junction. The vertical ledges of the pieces are interconnected by a first set of wires and the horizontal ledges of the pieces are interconnected by a corresponding second set of wires which intersect the wires of the first set, whereby the wing piece is pivoted from the platform piece about an axis passing through the points of intersection of the wires.

Parallel to the pivot axis is a torsion rod, one end of which is attached to a tab extending laterally from one end of the wing piece, the other end of the rod being adjustably anchored on a tab extending laterally from the corresponding end of the platform piece, the rod functioning as a column to prevent axial movement of the wing piece without impeding a swinging motion thereof. The adjustable anchor makes it possible to twist and lock the rod to apply a torque thereto setting the mechanical bias for zero.

OUTLINE OF THE DRAWING

For a better understanding of the invention as well as other objects and further features thereof, reference is made to the following detailed description to be read in conjunction with the accompanying drawing, wherein:

FIG. 1 is a schematic view of a differential-pressure transmitter including a cross-flexure pivot in accordance with the invention;

FIG. 2 is a perspective view of the cross-flexure pivot, as shown with the motor arm attached thereto;

FIG. 3 shows the cross-flexure pivot in perspective, without the motor arm or other arms attached thereto; and FIG. 4 is a transverse section taken through the cross-flexure pivot shown in FIG. 3.

DESCRIPTION OF THE INVENTION

THE D-P TRANSMITTER STRUCTURE: Referring now to FIG. 1, there is illustrated in schematic form a differential-pressure (D-P) transmitter in accordance with the invention. The two major elements of the D-P transmitter are (a) the measuring element that senses the existing differential pressure and converts it to a force, and (b) the force beam element that at one end receives the force from the measuring element, and at the other end receives a rebalancing force from a feedback motor.

The measuring element is generally defined as that portion of the instrument below the fulcrum or the force beam 10. This element includes a differential-pressure capsule provided with a pair of identical pressure chambers 11 and 12 in which are mounted corrugated metal diaphragms 11A and 12A. The diaphragms enclose a chamber containing a hydraulic fill 13. Low and high fluidic input pressures are applied to chambers 11 and 12, respectively.

In practice, suitable pipes carrying fluid under pressure are coupled to the chambers, the pipes being connected upstream and downstream of an orifice plate inserted in a process line, whereby the differential pressure between the upstream and downstream pipes is proportional to the square of the flow rate of fluid flow through the line or the differential pressure as in a level transmitter. The D-P transmitter may therefore be mounted directly in the line at a point remote from a central control station to which the measurement data is sent in the form of an electrical signal. At the control station, the received signal may be indicated or recorded, or used to operate process-control apparatus.

In the instrument capsule, diaphragms 11A and 12A are joined together by means of a horizontal link 14 whose midpoint is connected to the lower extremity of elongated force beam 10 which is pivotally supported in the vertical position by a seal diaphragm 15 and by vertical flexures (17A). Because of the difference between the low and high pressure fluids applied to pressure-responsive diaphragms 11A and 12A, the link 14 tends to shift leftward to an extent depending on this difference, thereby applying a force to the lower extremity of beam 10.

The purpose of hydraulic fill 13 is to provide hydraulic damping for noise, this being adjusted by throttling the flow of fluid in the passage between the diaphragm sections by means of a needle valve 16 inserted in the passage. Over range protection is provided by allowing the diaphragm to seat in a nest in the motor body which has convolutions matching those of the diaphragm.

The force developed by the differential pressure causes force beam 10 to swing in a clockwise direction about its fulcrum 17. Thus, produced in a force-beam extension 18 secured to the upper end of beam 10 and projecting upwardly therefrom, is a rightwardly directed force which pulls on a band type linkage 34. This force causes the overrange assembly generally designated by numeral 33 to pivot in a counterclockwise rotation about pivot 32. The upper end of the overrange assembly thus rotating produces a resultant force which pulls on a connecting rod 19 attached at right angles to the upper end of extension 33A. The other end of this rod is connected to the force motor beam which is mounted on a cross-flexure pivot 20 in accordance with the invention, this flexure pivot being disclosed in greater detail in the next section of the specification.

Also secured to cross-flexure pivot 20 is a motor arm 21, to whose lower portion is attached the coil 22 of a moving-coil or electrodynamic type of force motor, generally designated by numeral 23. The coil is counterbalanced in order to reduce the effects of gravity and vibration. This is accomplished by means of a counterweight 29 attached to the upper end of motor arm 21. The counterweight is provided with suitable balance-adjusting srews.

Also secured to cross-flexure pivot 20 is the arm 25 of a capacitive detector, generally designated by numeral 26. In the differential-pressure transmitter, detector 26, which is operatively coupled to the force bar by detector arm 25, changes in reactive value as a function of force-bar displacement. The detector is included in an electronic circuit which generates a feedback signal that is applied to feedback motor 23. Feedback motor 23, through its motor arm 21, applies a force to the force bar through connecting rod 19 and overrange assembly 33 in opposition to the input force. A more detailed disclosure of the electronic circuit, the capacitive detector and other aspects of the D-P transmitter may be found in the above-identified copending application.

The Cross-Flexure Pivot: Referring now to FIGS. 2, 3, and 4, it will be seen that the cross-flexure pivot includes a stationary platform provided with an end piece having an L-shaped formation defining a vertical ledge 24A and a horizontal ledge 24B. The junction between these ledges is linear and extends the full length of the platform piece.

Cooperating with the platform piece is a movable piece 25, having a reverse L-formation defining a vertical ledge 25A and a horizontal ledge 25B, the junction therebetween being linear and extending in parallel to the frame junction.

Inter-connecting vertical ledges 24A and 25A of the two pieces is a set of flexible metal wires 26, the set being composed of a pair of wires disposed adjacent to the opposite ends of the pieces. The wires are preferably welded to the ledges. In practice, the set may be composed of more than two wires.

Inter-connecting horizontal ledges 24B and 25B of the two pieces is a second set of flexible metal wires 27, the wires in the second set intersecting the wires of the first set. Thus the wing piece is pivoted from the platform piece about an axis X which passes through the points of intersection of the wires, this axis being parallel to the linear junctions of both pieces.

The wires are free to bend in any plane and therefore will not oil-can or cricket. This crossed wire flexure, therefore, produces a very linear frictionless pivot. But since the wires bend in all planes, additional means are necessary to restrain axial motion. Such restraint is obtained by a torsion rod 28 having a small diameter which is capable of being twisted within its elastic limits.

The rod is disposed in parallel to the pivot axis X and is close thereto. One end of the rod is attached or welded to a tab 29 extending laterally from one end of ledge 25A. The other end of the rod is adjustably anchored in a tab 30 extending laterally from the corresponding end of ledge 24A of the platform piece. This adjustable anchor is in the form of a knurled disc 31 which may be turned to twist the rod, the angular position of the disc being maintained by a set screw (not shown). Thus the rod may be twisted and set to produce a torque in a direction and to an extent sufficient to zero set the flexure pivot.

Thus the torsion rod acts as a column resisting axial displacement of the wing piece, the rod being twistable to permit bending of the wires.

While there has been disclosed a preferred embodiment of the invention, it will be appreciated that many changes may be made therein without departing from the spirit of the invention.

I claim:

1. A cross-flexure pivot for effecting a fulcrum between a lever arm and a fixed structural member or another lever arm, said flexure pivot comprising:
    A. a stationary platform piece having an L-shaped formation defining a horizontal ledge and a vertical ledge whose junction is linear,
    B. a movable wing piece having a reverse L-formation defining a vertical ledge positioned below the vertical ledge of said platform piece and a horizontal ledge positioned to one side of the horizontal ledge of said platform piece, said wing piece having a linear junction in parallel relation to the linear junction of the platform piece, said arms being attachable to respective ledges of the wing piece,
    C. a first set of bendable wires inter-connecting the horizontal ledges of said pieces,
    D. a second set of bendable wires inter-connecting the vertical ledges of said pieces and intersecting the first set of wires, whereby said wing piece is pivoted from said platform piece on an axis which passes through the points of intersection and is parallel to said linear junctions, and
    E. a torsion rod in parallel relation to said pivot axis, said rod being attached at one end to said wing piece and at the other end to said platform piece, said rod being twistable to permit swinging motion of said wing piece but acting as a column to prevent axial displacement thereof.

2. A cross-flexure pivot as set forth in claim 1, wherein the attachment of said torsion rod to said platform is adjustable to permit the application of a torque to said rod to "zero" set the flexure pivot.

3. A cross-flexure pivot as set forth in claim 1, wherein said wing piece is provided at one end with a lateral tab for attachment to said rod and said platform piece is provided at the other end with a tab to permit attachment to said rod.

4. A cross-flexure pivot as set forth in claim 2, wherein said adjustable attachment includes a disc mounted on said rod to facilitate twisting thereof.

5. A cross-flexure pivot as set forth in claim 1, wherein each set of wires is formed by a pair of wires.

6. A differential-pressure electronic transmitter comprising:
    A. a pivoted force bar,
    B. means to apply an input force to the lower end of the force bar to effect a displacement thereof as a function of the difference between a low pressure fluidic input and a high pressure fluidic input,
    C. a cross-flexure pivot including a stationary platform piece having an L-shaped formation defining a horizontal ledge and a vertical ledge whose junction is linear, a movable piece having a reverse L-formation defining a vertical ledge and a horizontal ledge whose junction is linear and parallel to the linear junction of the platform piece, two sets of intersecting bendable wires, the wires of one set interconnecting the horizontal ledges of the pieces and the wires of the other set interconnecting the vertical ledges of the pieces to create a pivot axis extending through the points of intersection, and a torsion rod in parallel relation to said pivot axis, said rod being attached at one end to said movable piece and at the other end to said stationary piece, said rod being twistable to permit swinging motion of said movable piece but acting as a column to prevent axial displacement thereof.
    D. a force motor having a motor coil,
    E. a motor arm coupling the said motor coil to one of the ledges of the wing piece,
    F. a connecting rod and lever system coupling the upper end of the motor arm to the upper end of said force bar, and
    G. means to detect displacement of said force bar and to apply a feedback signal to said force motor as a function of said displacement.

* * * * *